United States Patent
Yang et al.

(10) Patent No.: US 10,270,603 B2
(45) Date of Patent: Apr. 23, 2019

(54) PROCESSING CERTIFICATE VALIDATION WARNINGS

(71) Applicant: BlackBerry Limited, Waterloo (CA)

(72) Inventors: Chang Fung Yang, Mississauga (CA); Robert Marcel Dugal, Georgetown (CA); Jason Songbo Xu, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 202 days.

(21) Appl. No.: 15/073,347

(22) Filed: Mar. 17, 2016

(65) Prior Publication Data

US 2017/0272256 A1    Sep. 21, 2017

(51) Int. Cl.
| | | |
|---|---|---|
| *H04L 29/00* | (2006.01) | |
| *H04L 9/32* | (2006.01) | |
| *H04L 29/06* | (2006.01) | |
| *H04L 12/46* | (2006.01) | |

(52) U.S. Cl.
CPC ......... *H04L 9/3268* (2013.01); *H04L 9/3236* (2013.01); *H04L 12/4641* (2013.01); *H04L 63/0272* (2013.01); *H04L 63/0823* (2013.01)

(58) Field of Classification Search
CPC .. H04L 9/3268; H04L 9/3236; H04L 63/0272
USPC ....................................................... 713/156
See application file for complete search history.

(56) References Cited

U.S. PATENT DOCUMENTS

| | | | |
|---|---|---|---|
| 7,444,508 B2 * | 10/2008 | Karjala | ............... H04L 63/0272 713/155 |
| 7,478,236 B2 | 1/2009 | Roh et al. | |
| 9,081,940 B2 | 7/2015 | Trevor et al. | |
| 2004/0088542 A1 | 5/2004 | Daude et al. | |
| 2004/0268142 A1 | 12/2004 | Karjala et al. | |
| 2008/0195862 A1 | 8/2008 | Bender et al. | |
| 2009/0119221 A1 | 5/2009 | Weston et al. | |
| 2009/0228986 A1 | 9/2009 | Adler et al. | |
| 2014/0075185 A1 * | 3/2014 | Dragomir | ............. H04L 9/3268 713/156 |
| 2014/0282869 A1 | 9/2014 | Debbiere | |

OTHER PUBLICATIONS

Dany Rahal / Achieving E-mail security with PKI/ Mar. 7, 2003/ SANS Institute/ 1-15.*
Extended European Search Report issued in European Application No. 17158556.5 dated Apr. 20, 2017.

* cited by examiner

*Primary Examiner* — Anthony D Brown
*Assistant Examiner* — Michael D Anderson
(74) *Attorney, Agent, or Firm* — Fish & Richardson P.C.

(57) ABSTRACT

Systems, methods, and software can be used to process certificate validation warnings. In some aspect, a connection to a Virtual Private Network (VPN) server is initiated at an electronic device. The VPN server is associated with a VPN profile. In response to initiating the connection, a certificate associated with the VPN server is received at the electronic device. A validation warning associated with the certificate is received. A fingerprint of the certificate is generated. A validation action is selected based on the validation warning, the fingerprint, and the VPN profile. The selected validation action is executed.

19 Claims, 3 Drawing Sheets

PROCESSING CERTIFICATE VALIDATION WARNINGS

BACKGROUND

The present disclosure relates to processing certificate validation warnings. In some cases, a certificate can be used in an authentication process. For example, in a public-key infrastructure (PKI), a public key certificate can be used to prove the identity of an owner of the public key. The certificate can include information about the key, the owner's identity, and a digital signature of an entity that has verified the certificate's contents.

DESCRIPTION OF DRAWINGS

Like reference numbers and designations in the various drawings indicate like elements.

DETAILED DESCRIPTION

In some cases, electronic devices, including mobile devices, or other computer systems, can initiate a VPN (Virtual Private Network) connection to perform certain tasks. In some cases, an electronic device may establish a VPN connection with a VPN server, and transfer files over the VPN connections. An electronic device may also establish a VPN connection with a VPN server to communicate with another device using, e.g., email, text, or online chat. In some cases, the VPN connection provides more security than a connection over public Internet. For example, the VPN connection may be encrypted to protect the content transferred over the VPN connection.

In some cases, during the establishment of the VPN connection, the identity of the VPN sever can be authenticated. In some cases, the authentication can be based on PKI protocols. For example, the authentication procedure can include validation of the certificate of the VPN server. In some cases, the validation procedures can generate one more validation warnings. Validation warnings can be categorized into one or more groups. For example, one group of validation warnings can include acceptable warnings without user inputs. If no warning is received, or the warnings received during a validation procedure are acceptable warnings without user inputs, the validation is successful and the electronic device can proceed to the next step of VPN connection. Examples of the acceptable warnings without user inputs can include a warning indicating that the certificate chain contains intermediate certificates, or a warning indicating that the certificate revocation list (CRL) is not found.

Another group of warnings can include rejection warnings without user inputs. If at least one warning received during a validation procedure is a rejection warning without user inputs, the validation fails and the VPN connection may not be established. Examples of the rejection warnings without user inputs can include a warning indicating invalid signature, invalid issuer, unknown critical extension, or basic constraint not critical. Yet another group of warnings can include prompt warnings, or warnings requesting further user inputs. If at least one warning received during a validation procedure is a prompt warning, and no rejection warnings without user inputs have been received, the electronic device can prompt the user for a selection of current action. The user can select to accept and proceed with the VPN connection, or select to reject and stop the VPN connection. In some cases, the user can view information about the warnings, information about the certificate, or a combination thereof, before making the selection. Examples of the prompt warnings can include a warning indicating that the certificate includes basic constraints, a warning indicating the CRL signature is invalid, a warning indicating that the certificate is included in a black list, and a warning indicating that the key usage is invalid.

In some cases, a user can select a command for future actions regarding the group of warnings requesting further user inputs. The command for future actions may indicate whether user inputs should be requested if warnings are generated by VPN connections to the same VPN server. For example, a "Don't Remind Me" option can be outputted on the electronic device. If the option is selected, then the user may not be prompted if warnings are generated by VPN connections to the same VPN server. In this or other example, the current action selected by the user can be executed automatically in the future without additional user input. In one instance, the user selects to accept the warning and the "Don't Remind Me" option. In this instance, if a warning is received in future validation procedures regarding the same VPN server and the warning is included in the group of warnings requesting further user inputs, the warning would be treated as acceptable warnings without user inputs and would not be prompted for user inputs in future VPN connection establishments. In another instance, the user selects to reject the warning and the "Don't Remind Me" option. In this instance, if a warning is received in future validation procedures regarding the same VPN server and the warning is included in the group of warnings requesting further user inputs, the warning would be treated as rejection without user inputs and would result in validation failure. In some cases, enabling the user to selecting a command for future action can improve the user experience. For example, a VPN connection may be dropped and re-established when an electronic device moves between networks. Reducing user interactions in VPN connection establishment can provide seamless connections when network connections are changed.

However, in some cases, selecting a future validation action for a VPN server may include security risks. In one example, in a man-in-the-middle attack, an attacker can impersonate a VPN server, and send a different certificate to the electronic device in response to a VPN connection request to the VPN server by the electronic device. The electronic device can receive validation warnings when validating the different certificate. However, because the user had previously selected the "Don't Remind Me" option, the electronic device may accept the different certificate and proceed to connect with the impersonating VPN server without providing the user information related to the warnings or the certificates for user inputs. In another example, a different warning may be generated for a certificate associated with the same VPN server. However, because the user had previously selected the "Don't Remind Me" option, the electronic device may accept the different warning without providing the user information related to the different warning for user inputs.

Figure 1:
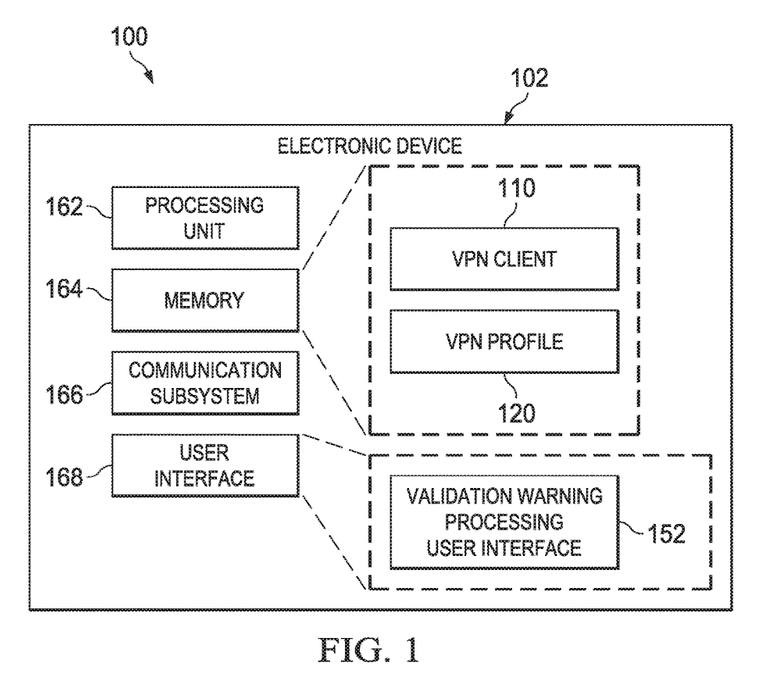
FIG. 1 is a schematic diagram showing an example electronic device that processes certificate validation warnings
Figure 2:
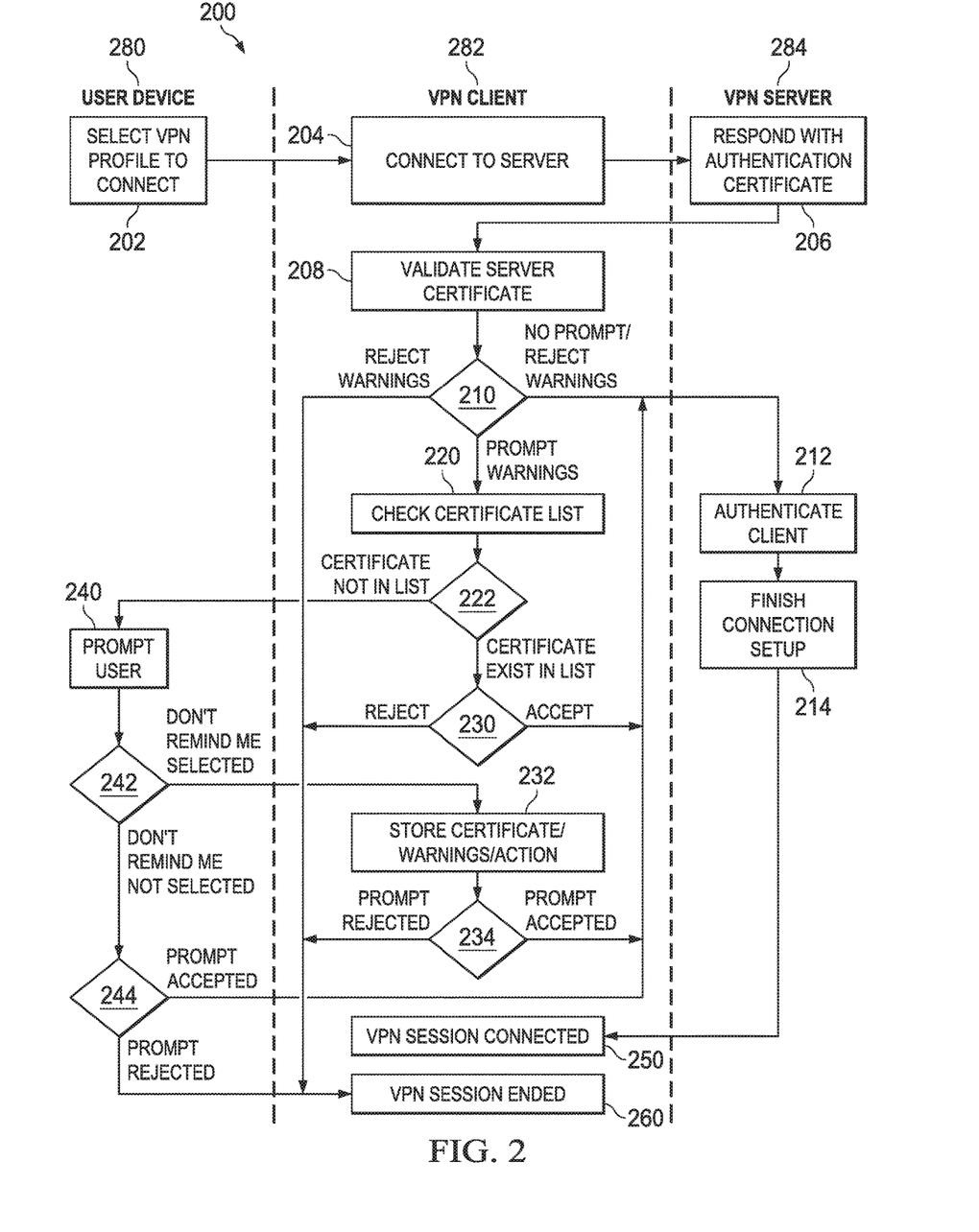
FIG. 2 is a flow diagram showing an example process for certificate validation warning.
Figure 3:
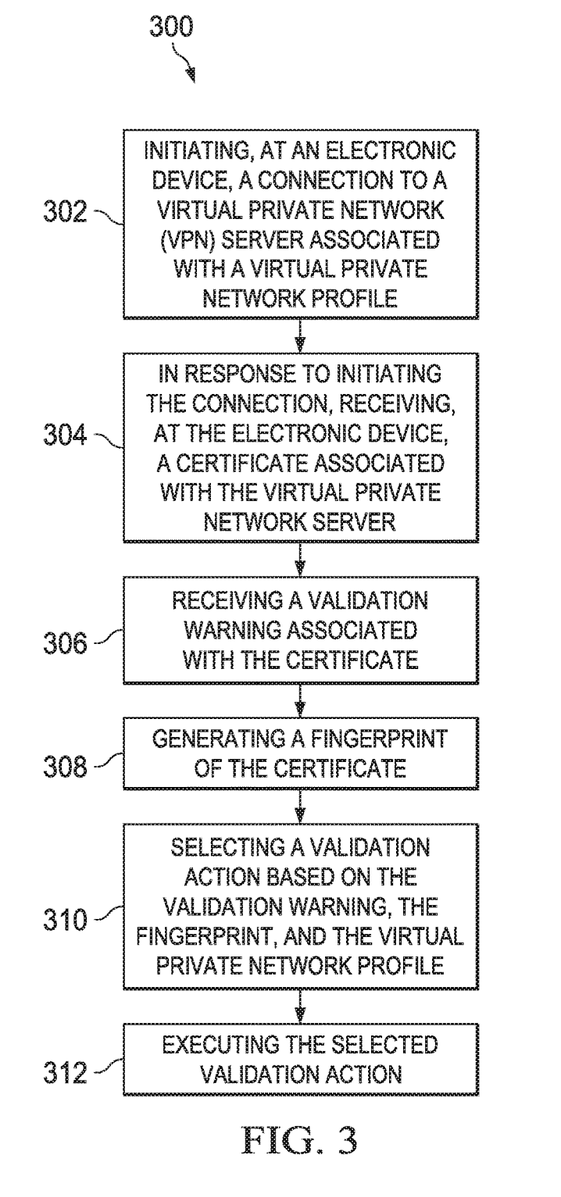
FIG. 3 is a flowchart showing an example method for processing certificate validation warnings.

In some cases, a fingerprint of a certificate can be stored in association with a validation action. In some cases, one or more warnings can be stored in association with the fingerprint of the certificate and the validation action. The electronic device can execute an associated validation action if the fingerprint of a received certificate matches the stored fingerprint, the received warnings match the stored warnings, or a combination thereof. This approach can improve user experience while reducing security risks. FIGS. 1-3 and associated descriptions provide additional details of these implementations.

FIG. 1 is a schematic diagram 100 showing an example electronic device 102 that processes certificate validation warnings. The electronic device 102 includes a processing unit 162, a communication subsystem 166, a user interface 168, and a memory 164. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 162 can be configured to generate control information, such as a measurement report, or respond to received information, such as control information from a network node. In some cases, the processing unit 162 can also be configured to make a radio resource management (RRM) decision, such as cell selection/reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 1, the example user interface 168 can be configured to output one or more validation warning processing user interfaces 152. The validation warning processing user interfaces 152 can include user interfaces that enable the user to select validation actions based on validation warnings. FIGS. 2-3 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of electronic device 102 and various other computer-executable software programs for performing one or more of the processes, steps, or actions described above.

As shown in FIG. 1, the example memory 164 can include one or more VPN clients 110. The VPN client 110 represents an application, set of applications, software, software modules, hardware, or combination thereof that can be configured to manage a VPN connection. In some cases, the VPN client 110 can initiate a connection to a VPN server, receive a certificate from the VPN server, validate the certificate, process the certificate validation warnings, and complete a VPN connection. FIGS. 2-3 and associated descriptions provide additional details of these implementations.

As shown in FIG. 1, the example memory 164 can include one or more VPN profiles 120. The VPN profile 120 represents a file, an application, a set of applications, software, software modules, hardware, or combination thereof that can be configured to store configuration information for a VPN connection. In some cases, a VPN profile, e.g., the VPN profile 120, can be associated with a VPN server. When the electronic device initiates a VPN connection to a particular VPN server, the configuration information in the VPN profile associated with the particular VPN server can be applied. Examples of configuration information in a VPN profile can include the Internet Protocol (IP) address of the particular VPN server, communication protocols for the particular VPN server, security settings for the particular VPN server, user credentials, e.g., username and password, associated with the particular VPN server, gateway type of the VPN server, server and client authentication type of the VPN connection, Domain Name Server (DNS) for the VPN connection, and certificate of the VPN client 110. In some cases, the VPN profile 120 can be pushed, updated, or deleted by an enterprise mobility management (EMM) server. The EMM server represents an application, set of applications, software, software modules, hardware, or combination thereof that can configured to manage applications and devices for an enterprise. For example, the EMM server can install, update, and manage the license of enterprise applications for the electronic device. In some cases, the EMM server can manage a VPN connection to a VPN server that is associated with the enterprise by pushing or updating the VPN profile 120 associated with the VPN server.

In some cases, the VPN profile 120 can include a certificate list associated with the particular VPN server. The certificate list can include a certificate, a fingerprint of a certificate, or a combination thereof. In some cases, the certificate list can also include one or more configured warnings associated with the certificate or the fingerprint of the certificate. In some cases, the certificate list can also include a configured validation action that is associated with the configured certificate or the configured fingerprint of the certificate, the one or more configured warnings, or a combination thereof. FIGS. 2-3 and associated descriptions provide additional details of these implementations.

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 2 is a flow diagram showing an example process 200 for certificate validation warning. As shown in FIG. 2, the process 200 can be implemented by a user device 280, a VPN client 282, and a VPN server 284. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order.

The user device 280 represents an electronic device such as the device 102 of FIG. 1. In some cases, the user device 280 can be prompted for a user selection in an user interface. In response, the user device 280 can provide a user command. In some cases, the user command can be executed by a voice command, key press, touch, click, swipe, or any other gesture or input supported by the electronic device.

The VPN server 284 represents an application, set of applications, software, software modules, hardware, or combination thereof that can be configured to provide a VPN connection to an electronic device. In some cases, the VPN server 284 can provide a certificate to the electronic device. The electronic device can authenticate the identity of the VPN server 284 by validating the certificate of the VPN server 284. The descriptions below provide additional details of these implementations.

The VPN client 282 represents an application, set of applications, software, software modules, hardware, or combination thereof that can be configured to manage a VPN connection. In some cases, the VPN client 282 can initiate a connection to the VPN server 284, receive a certificate from the VPN server 284, validate the certificate, process the certificate validation warnings, and complete a VPN connection. In some cases, the VPN client 282 can be implemented on an electronic device, e.g., the electronic device 102. The descriptions below provide additional details of these implementations.

The example process 200 begins at 202, where a VPN profile is selected on an electronic device for a VPN connection. In some cases, the VPN profile can be selected by the user device 280. For example, the user device 280 can receive user input corresponding to a selection of a VPN profile stored on the electronic device to initiate a VPN connection. Alternatively or in combination, the VPN connection can be initiated without user input. For example, a VPN profile can be configured to associate with a VPN connection or a VPN server. When the electronic device, triggered by the user device 280 or any other command in or outside of the electronic device, initiates a VPN connection to the VPN server, the associated VPN profile is automatically selected without user input.

From 202, the process 200 proceeds to 204, where the VPN client 282 initiates a VPN connection to the VPN server 284 that is associated with the selected VPN profile. In some cases, the VPN client 282 can send a VPN connection request to the VPN server 284 to initiate the VPN connection. In some cases, the VPN client 282 can request a certificate of the VPN server 284.

From 204, the process 200 proceeds to 206, where the VPN server 284 responds to the VPN connection initiation. In some cases, the VPN server 284 can send a response message to the VPN client 282. In some cases, the response message can include a certificate of the VPN server 284.

From 206, the process 200 proceeds to 208, where the VPN client 282 performs a certificate validation procedure on the received certificate from the VPN server 284. In some cases, the certificate validation procedure can be performed on the electronic device. In some cases, the electronic device can request additional information from a certificate authority, a security server, or a combination thereof to complete the validation procedure. In some cases, the certificate validation procedure can produce one or more validation warnings.

From 208, the process 200 proceeds to 210, where the VPN client 282 determines the types of the validation warnings generated by the certificate validation procedure. If no warning is received, or the warnings are acceptable without user inputs, the process 200 proceeds from 210 to 212. At 212, the VPN client 282 respond to the VPN server 284, indicating that the VPN server 284 has been authenticated. The VPN server 284 proceeds to authenticate the VPN client 282. If the authentication is successful, from 212, the process 200 proceeds to 214, where the VPN server 284 completes the VPN connection setup. From 214, the process 200 proceeds to 250, where the VPN client 282 and the VPN server 284 are connected in a VPN session. In some cases, if the VPN server 284 cannot authenticate the VPN client 282, the VPN connection fails.

If the VPN client 282 determines, at 210, that the warnings indicate that the validation fails without user inputs, the process 200 proceeds from 210 to 260. At 260, the VPN server 284 is rejected due to failed authentication and the VPN session ends without a successful VPN connection.

If the VPN client 282 determines, at 210, that the warnings request further user inputs, the process 200 proceeds from 210 to 220. At 220, the VPN client 282 checks whether the received certificate is included in a list of certificates. In some cases, the list of certificates include one or more certificates. In some cases, the list of certificate also includes one or more validation actions. Each certificate in the list is associated with a respective validation action. Examples of the validation actions can include "validation without user input," "rejection without user input," "requesting user input," and any other validation actions. In some cases, the list of certificates can be generated, updated, or a combination thereof, by the electronic device. For example, when a user selects a validation action in responses to a warning from a particular certificate, the electronic device can store the validation action in association with the certificate in the list of certificates. The descriptions below (e.g., step 232) provide additional details of these implementations.

In some cases, the list of certificates can be included in the VPN profile selected at 202. In some cases, the list of certificates can be pushed to the electronic device, updated, or a combination thereof, by an enterprise mobility management (EMM) server. In some cases, the EMM server can push a VPN profile associated with the VPN server 284 to the electronic device. For example, an Information Technology (IT) administrator of an enterprise can configure a VPN profile and use the EMM server to push the VPN profile to the devices managed by the EMM server for the enterprise. The VPN profile can include a configured list of certificates. In some cases, the EMM server can update the list of certificates by pushing an updated VPN profile. This approach may provide one or more advantages. For example, the IT administrator, the EMM server, or a combination thereof may receive an updated information about a security risk associated with a certificate. The configured validation action associated with the certificate can be updated by pushing an updated VPN profile that includes an updated list of certificates.

In some cases, the list of certificates can be indexed using fingerprints of the certificates. Each certificate in the list can be represented by the fingerprint of the certificate. In some cases, the fingerprint can be created by applying a hashing function on the certificate. Examples of the hashing function include the Secure Hash Algorithm (SHA)-256 algorithm. Alternatively or in combination, MD5, SHA-1 or other security algorithms can be used to create a fingerprint on the certificate. In some cases, the VPN client 282 can create a fingerprint of the certificate received from the VPN server 284 and check whether the fingerprint of the received certificate is included in a list of the certificate fingerprints.

In some cases, in addition to the certificate or the fingerprint of the certificate, the validation actions in the list are also associated with one or more validation warnings. For example, a validation action can be associated with a particular certificate and one or more particular warnings. In some cases, a warning bitmap can be used to represent a combination of warnings. For example, each particular warning can be assigned to a bit position in a warning bitmap. If the particular warning is included in the combination of warning, the bit position corresponding to the particular warning can be set to '1.' If the particular warning is not included in the combination of warning, the bit position corresponding to the particular warning can be set to '0.' Therefore, a warning bitmap can be used to indicate one or a combination of more than one warnings, and a validation action can be associated with a particular certificate and a particular warning bitmap. In some cases, the identities of the validation warnings associated with a certificate, e.g., a bitmap of the validation warnings, are stored with the associated certificate in the list of the certificates.

In some cases, the number of the entries e.g., a certificate and its associated warning bitmap, in a list of certificates associated with one VPN profile, can be configured. In one example, in one VPN profile, up to 5 entries can be included in the list of certificate. In some cases, if an addition of a new entry may increase the number of entries beyond the configured threshold, one or more existing entries may be purged. In one example, the time that each entry is created is tracked, e.g., using a timestamp associated with the entry, and the oldest entry may be purged. Alternatively or in addition, the source that creates the entry may be tracked and an existing entry created by one or more sources may be deleted. For example, if an existing entry is created by user actions, e.g., at step 242 discussed below, the existing entry may be deleted. On the other hand, if an existing entry is created and pushed to the device by an EMM server as discussed above, the entry may be preserved.

If the VPN client 282 determines, at 210, that the warnings request further user inputs, the process 200 proceeds from 210 to 220. At 220, the VPN client 282 checks whether the received certificate is included in a list of certificates associated with validation actions.

From 220, the process 200 proceeds to 222, where the VPN client 282 determines whether the received certificate is included in the list of certificates. In some cases, the received certificate is determined to be included in the list of certificates if the received certificate matches at least one certificate in the list, or a fingerprint of the received certificate matches a fingerprint in the list of certificate fingerprints. In some cases, in addition to matching the certificate or the fingerprint of the certificate, the received certificate is determined to be included in the list of certificates if the warnings received at step 208 match the warnings associated with the certificate. For example, if a fingerprint of a received certificate matches a certificate fingerprint in the list, but at least one received warning is not included in the warnings indicated by the warning bitmap associated with the certificate fingerprint, the certificate can be determined not included in the list of certificates.

If the received certificate, and in some cases, the received warnings, are determined to be included in the list as discussed above, from 222, the process 200 proceeds to 230. At 230, the VPN client 282 identifies the configured validation action that is associated with the certificate, and in some cases, the one or more warnings associated with the certificate. The VPN client 282 can execute the configured validation action accordingly. For example, if the configured validation action indicates "validation without user input," from 230, the process 200 proceeds to 212, where the VPN client 282 indicates that the VPN server 284 is validated and the VPN server 284 proceeds to authenticate the VPN client 282. If the configured validation action indicates "rejection without user input," from 230, the process 200 proceeds to 260, where the authentication of the VPN server 284 fails and the VPN session ends.

If the received certificate, and in some cases, the received warnings, are determined not included in the list as discussed above, from 222, the process 200 proceeds to 240. At 240, a user input is requested. In some cases, the user input can be requested by outputting a user interface on the electronic device. In some cases, the user interface can output information about the warnings, information about the received certificate, or a combination thereof. Information about the received certificate can include the signing entity, organizational unit, common name, serial number, X.509 version, signature algorithm, not-valid-before date, not-valid after-date, public key information, CRL Uniform Resource Identifier (URI) or any other information associated with the certificate. Information about the warning can include the issues that trigger the warning, e.g., whether the warning is triggered by a basic constraint path length, an invalid key usage, an invalid CRL signature, a certificate blacklist, a name constraint, or any other issues. Alternatively or in combination, the user interface can include one or more user interface objects that are associated with information about the warnings, information about the certificate, or a combination thereof. If the user interface object is selected, one or more additional user interfaces can be outputted on the electronic device. The additional user interface can include the information about the warnings, the information about the certificate, or a combination thereof.

In some cases, the user input requested includes a validation action. Example of validation actions include "accepting validation" and "rejecting validation." In some cases, the user input requested also includes a command for future user interactions. In one example, the command for future user interactions can indicate "no future user input." Such a command can indicate a user preference of using the current selected action for the certificate, and in some cases, the associated warnings, in future without additional user inputs. In some cases, the user device 280 can receive user input corresponding to a selection of the "no future user input" command by selecting a "don't remind me" option. In another example, the command for future user interactions can indicate "requesting future user inputs." Such a command can indicate a user preference of requesting user input for the certificate, and in some cases, the associated warnings, instead of using the current selected action by default. In some cases, the user device 280 can receive user input corresponding to a selection of the "requesting future user inputs" command by selection of the "don't remind me" option.

In response to the user input request, a user input is received by the electronic device. In some cases, the user input can be received through a voice command, key press, touch, click, swipe, or any other gesture or input that is associated with one or more actions. In some cases, the user input can include both a selected action and a command for future user interactions.

From 240, the process 200 proceeds to 242, where the future user interactions are determined based on the user input. For example, if the command for future user interaction indicates "no future user input," the process 200 proceeds from 242 to 232. At 232, the VPN client 282 stores the certificate or the fingerprint of the certificate, and in some cases, the received warnings, in association with the selected action received at 240 in the list of certificates. From 232, the process 200 proceeds to 234, where the selected action is determined. If the selected action indicates that the validation is accepted, the process 200 proceeds from 234 to 212. If the selection action indicates that the validation is rejected, the process 200 proceeds from 234 to 260.

If the command for future user interaction indicates "requesting future user input," the process 200 proceeds from 242 to 244. At 244, the selected action is determined. If the selected action indicates that the validation is accepted, the process 200 proceeds from 234 to 212. If the selection action indicates that the validation is rejected, the process 200 proceeds from 234 to 260.

FIG. 3 is a flowchart showing an example method 300 for processing certificate validation warnings. The method 300 can be implemented by an electronic device, e.g., the electronic device 102. The example method 300 shown in FIG. 3 can also be implemented using additional, fewer, or different operations, which can be performed in the order shown or in a different order.

The example method 300 begins at 302, where a connection to a VPN server is initiated at an electronic device. The VPN server is associated with a VPN profile. At 304, in response to initiating the connection, a certificate associated with the VPN server is received at the electronic device. At 306, a validation warning associated with the certificate is received. At 308, a fingerprint of the certificate is generated. At 310, a validation action is selected based on the validation warning, the fingerprint, and the VPN profile. At 312, the selected validation action is executed.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data-processing apparatus," "computer," or "electronic computer device" encompass all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

Some of the processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations, of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
    initiating, at an electronic device, a connection to a Virtual Private Network (VPN) server associated with a VPN profile, wherein the VPN profile includes a list of configured validation actions, the list comprises a plurality of configured validation actions, each of the plurality of configured validation actions in the list corresponds to a respective configured validation warning and a respective configured fingerprint, and each configured fingerprint corresponds to a respective certificate;
    in response to initiating the connection, receiving, at the electronic device, a certificate associated with the VPN server;
    receiving a validation warning associated with the certificate;
    generating a fingerprint of the certificate;
    determining that the validation warning matches a configured validation warning in the list of configured validation actions and that the fingerprint matches a configured fingerprint in the list of configured validation actions;
    in response to the determining that the validation warning matches the configured validation warning in the list of configured validation actions and that the fingerprint matches a configured fingerprint in the list of configured validation actions, selecting, as a validation action, the configured validation action in the list of configured validation actions that corresponds to the configured validation warning and the configured fingerprint; and
    executing the selected validation action.

2. The method of claim 1, wherein the configured validation action is stored during a previous VPN connection, and wherein the respective configured validation warning and the respective configured fingerprint corresponding to the configured validation action are received during the previous VPN connection.

3. The method of claim 1, wherein the validation action comprises at least one of rejecting the validation warning, accepting the validation warning, or outputting a user interface for processing the validation warning.

4. The method of claim 1, wherein the virtual private network (VPN) profile is received at the electronic device from an enterprise mobility management (EMM) server.

5. The method of claim 1, further comprising performing a validation procedure of the certificate associated with the VPN server, and wherein the validation warning is received in response to the validation procedure.

6. The method of claim 1, wherein the fingerprint is generated by using a hashing function.

7. An electronic device, comprising:
    a memory; and
    at least one hardware processor communicatively coupled with the memory and configured to:
        initiate, at the electronic device, a connection to a Virtual Private Network (VPN) server associated with a VPN profile, wherein the VPN profile includes a list of configured validation actions, the list comprises a plurality of configured validation actions, each of the plurality of configured validation actions in the list corresponds to a respective configured validation warning and a respective configured fingerprint, and each configured fingerprint corresponds to a respective certificate;
        in response to initiating the connection, receive, at the electronic device, a certificate associated with the VPN server;
        receive a validation warning associated with the certificate;
        generate a fingerprint of the certificate;
        determine that the validation warning matches a configured validation warning in the list of configured validation actions and that the fingerprint matches a configured fingerprint in the list of configured validation actions;
        in response to the determining that the validation warning matches the configured validation warning in the list of configured validation actions and that the fingerprint matches a configured fingerprint in the list of configured validation actions, select, as a validation action, the configured validation action in the list of configured validation actions that corresponds to the configured validation warning and the configured fingerprint; and execute the selected validation action.

8. The electronic device of claim 7, wherein the configured validation action is stored during a previous VPN connection, and wherein the respective configured validation warning and the respective configured fingerprint corresponding to the configured validation action are received during the previous VPN connection.

9. The electronic device of claim 7, wherein the validation action comprises at least one of rejecting the validation warning, accepting the validation warning, or outputting a user interface for processing the validation warning.

10. The electronic device of claim 7, wherein the virtual private network (VPN) profile is received at the electronic device from an enterprise mobility management (EMM) server.

11. The electronic device of claim 7, wherein the at least one hardware processor is configured to perform a validation procedure of the certificate associated with the VPN server, and wherein the validation warning is received in response to the validation procedure.

12. The electronic device of claim 7, wherein the fingerprint is generated by using a hashing function.

13. A non-transitory computer-readable medium containing instructions which, when executed, cause a computing device to perform operations comprising:

initiating, at an electronic device, a connection to a Virtual Private Network (VPN) server associated with a VPN profile, wherein the VPN profile includes a list of configured validation actions, the list comprises a plurality of configured validation actions, each of the plurality of configured validation actions in the list corresponds to a respective configured validation warning and a respective configured fingerprint, and each configured fingerprint corresponds to a respective certificate;

in response to initiating the connection, receiving, at the electronic device, a certificate associated with the VPN server;

receiving a validation warning associated with the certificate;

generating a fingerprint of the certificate;

determining that the validation warning matches a configured validation warning in the list of configured validation actions and that the fingerprint matches a configured fingerprint in the list of configured validation actions;

in response to the determining that the validation warning matches the configured validation warning in the list of configured validation actions and that the fingerprint matches a configured fingerprint in the list of configured validation actions, selecting, as a validation action, the configured validation action in the list of configured validation actions that corresponds to the configured validation warning and the configured fingerprint; and executing the selected validation action.

14. The computer-readable medium of claim 13, wherein the configured validation action is stored during a previous VPN connection, and wherein the respective configured validation warning and the respective configured fingerprint corresponding to the configured validation action are received during the previous VPN connection.

15. The computer-readable medium of claim 13, wherein the validation action comprises at least one of rejecting the validation warning, accepting the validation warning, or outputting a user interface for processing the validation warning.

16. The computer-readable medium of claim 13, wherein the virtual private network (VPN) profile is received at the electronic device from an enterprise mobility management (EMM) server.

17. The computer-readable medium of claim 13, wherein the operations further comprise performing a validation procedure of the certificate associated with the VPN server, and wherein the validation warning is received in response to the validation procedure.

18. The method of claim 1, wherein the validation warning comprises at least one of a rejection warning without user input or a prompt warning.

19. The method of claim 1, wherein the validation action comprises outputting at least one of information of the validation warning or information of the certificate, wherein the information of the validation warning indicates an issue that triggers the validation warning, and the information of the certificate comprises at least one of a signing entity, an organizational unit, a common name, a serial number, an X.509 version, a signature algorithm, a not-valid-before date, a not-valid after-date, a public key information, or a certificate revocation list (CRL) Uniform Resource Identifier (URI).

* * * * *